(12) United States Patent
Thukral et al.

(10) Patent No.: US 9,146,868 B1
(45) Date of Patent: Sep. 29, 2015

(54) SYSTEMS AND METHODS FOR ELIMINATING INCONSISTENCIES BETWEEN BACKING STORES AND CACHES

(71) Applicant: Symantec Corporation, Mountain View, CA (US)

(72) Inventors: Mithlesh Thukral, Pune (IN); Mukesh Bafna, Pune (IN)

(73) Assignee: Symantec Corporation, Mountain View, CA (US)

( * ) Notice: Subject to any disclaimer, the term of this patent is extended or adjusted under 35 U.S.C. 154(b) by 324 days.

(21) Appl. No.: 13/743,800

(22) Filed: Jan. 17, 2013

(51) Int. Cl.
*G06F 12/00* (2006.01)
*G06F 13/00* (2006.01)
*G06F 13/28* (2006.01)
*G06F 12/08* (2006.01)

(52) U.S. Cl.
CPC ........ *G06F 12/0808* (2013.01); *G06F 12/0804* (2013.01)

(58) Field of Classification Search
None
See application file for complete search history.

(56) References Cited

U.S. PATENT DOCUMENTS

| | | | | |
|---|---|---|---|---|
| 5,341,493 A | * | 8/1994 | Yanai et al. | 711/161 |
| 5,682,513 A | * | 10/1997 | Candelaria et al. | 711/113 |
| 5,948,062 A | * | 9/1999 | Tzelnic et al. | 709/219 |
| 6,691,245 B1 | * | 2/2004 | DeKoning | 714/6.31 |
| 8,838,539 B1 | * | 9/2014 | Ashcraft et al. | 707/637 |
| 2003/0212865 A1 | * | 11/2003 | Hicken et al. | 711/135 |
| 2006/0015767 A1 | * | 1/2006 | Sun Hsu et al. | 714/5 |
| 2006/0047925 A1 | * | 3/2006 | Perry | 711/162 |
| 2006/0282699 A1 | * | 12/2006 | Brondijk et al. | 714/5 |
| 2007/0250672 A1 | * | 10/2007 | Stroberger et al. | 711/162 |
| 2009/0031083 A1 | * | 1/2009 | Willis et al. | 711/135 |
| 2011/0208914 A1 | * | 8/2011 | Winokur et al. | 711/119 |
| 2012/0221774 A1 | * | 8/2012 | Atkisson et al. | 711/103 |

* cited by examiner

*Primary Examiner* — Yaima Rigol
(74) *Attorney, Agent, or Firm* — ALG Intellectual Property, LLC

(57) ABSTRACT

A computer-implemented method for eliminating inconsistencies between backing stores and caches may include (1) detecting at least one inconsistency between a backing store and a cache, (2) identifying a synchronization marker that bifurcates write operations queued in the cache into (i) a subset of one or more write operations known to have been successfully performed on the backing store and (ii) an additional subset of one or more additional write operations not yet known to have been successfully performed on the backing store, (3) identifying the additional subset of additional write operations based at least in part on the synchronization marker, (4) performing the additional subset of additional write operations on the backing store, and then (5) updating the synchronization marker based at least in part on performing the additional subset of additional write operations on the backing store. Various other methods, systems, and computer-readable media are also disclosed.

20 Claims, 6 Drawing Sheets

SYSTEMS AND METHODS FOR ELIMINATING INCONSISTENCIES BETWEEN BACKING STORES AND CACHES

BACKGROUND

Data storage systems often include multiple devices that serve different purposes. For example, a data storage system may include a backing device (such as a disk drive) that provides relatively slow and inexpensive long-term storage for application data. In this example, the data storage system may also include a cache device (such as a solid-state drive) that provides relatively fast and expensive short-term storage for the application data.

In order to function properly, the data storage system may need to maintain a certain level of consistency across the application data stored in the backing device and the cache device. For example, when an application issues a write operation, the data storage system may perform the write operation on the cache device and then propagate the write operation to the backing device in order to synchronize the application data stored in the backing device and the cache device. By synchronizing the application data stored in the backing device and the cache device, the data storage system may ensure that the application does not experience downtime or input/output errors resulting from inconsistencies between the backing store and the cache device.

Unfortunately, in the event that the data storage system is unable to successfully perform the write operation on the backing store (due, e.g., to one or more system failures), the data storage system may be unable to synchronize the application data stored in the backing store and the cache device. As a result, the application data may develop inconsistencies that ultimately lead to application downtime or input/output errors. What is needed, therefore, are systems and methods for eliminating inconsistencies between backing devices and cache devices in order to avoid application downtime and input/output errors resulting from failed write operations.

SUMMARY

As will be described in greater detail below, the instant disclosure generally relates to systems and methods for eliminating inconsistencies between backing stores and caches by synchronizing the application data stored in the backing stores and caches after one or more failed write operations.

In one example, a computer-implemented method for eliminating inconsistencies between backing stores and caches may include (1) detecting at least one inconsistency between a backing store and a cache that queues write operations destined for the backing store, (2) identifying a synchronization marker that bifurcates the write operations queued in the cache into (i) a subset of one or more write operations known to have been successfully performed on the backing store and (ii) an additional subset of one or more additional write operations that are not yet known to have been successfully performed on the backing store, (3) identifying the additional subset of additional write operations based at least in part on the synchronization marker that bifurcates the write operations queued in the cache, (4) performing the additional subset of additional write operations on the backing store in order to eliminate the inconsistency between the backing store and the cache, and then (5) updating the synchronization marker based at least in part on performing the additional subset of additional write operations on the backing store.

In some examples, the method may also include detecting a failed attempt to perform a write operation on the backing store. In such examples, the method may further include adding the write operation to the additional subset of additional write operations not yet known to have been successfully performed on the backing store.

In some examples, the method may also include determining that the additional subset of additional write operations not yet known to have been successfully performed on the backing store has reached a predefined maximum number of write operations. In such examples, the method may further include comparing the additional subset of additional write operations with the predefined maximum number of write operations on a periodic basis. In addition, the method may include determining that the additional subset of additional write operations has reached the predefined maximum number of write operations based at least in part on this comparison.

In some examples, the method may also include obtaining synchronization information that identifies the synchronization marker from the backing store. In such examples, the method may further include locating the synchronization marker in the cache based at least in part on the synchronization information obtained from the backing store.

In some examples, the method may also include detecting a read operation issued by an application using the backing store and the cache prior to performing the additional subset of additional write operations on the backing store. In such examples, the method may further include performing the read operation on the cache instead of the backing store in order to enable the application to avoid downtime resulting from the inconsistency between the backing store and the cache.

In some examples, the method may also include determining that the inconsistency resulted from a temporary storage error. In such examples, the method may further include determining that the temporary storage error has been resolved. In addition, the method may include performing the additional subset of additional write operations on the backing store in response to determining that the temporary storage error has been resolved in order to eliminate the inconsistency between the backing store and the cache.

In some examples, the method may also include determining that the inconsistency resulted from a permanent hardware failure on the backing store. In such examples, the method may further include identifying a replica backing store configured to mirror the backing store and then synchronizing the replica backing store and the cache by performing the additional subset of additional write operations on the replica backing store. In addition, the method may include replacing the backing store with the replica backing store such that the cache queues write operations destined for the replica backing store instead of queuing write operations destined for the backing store.

In some examples, the method may also include obtaining replica synchronization information from the replica backing store. In such examples, the method may further include determining that at least a portion of the subset of write operations and the additional subset of additional write operations have not yet been performed on the replica backing store based at least in part on the replica synchronization information. In addition, the method may include performing the portion of the subset of write operations and all of the additional subset of additional write operations on the replica backing store in response to this determination.

In some examples, the method may also include modifying the synchronization marker to indicate that the additional subset of additional write operations have been successfully performed on the backing store.

In one embodiment, a system for implementing the above-described method may include (1) a detection module programmed to detect at least one inconsistency between a backing store and a cache that queues write operations destined for the backing store, (2) an identification module programmed to (i) identify a synchronization marker that bifurcates the write operations queued in the cache into (a) a subset of one or more write operations known to have been successfully performed on the backing store and (b) an additional subset of one or more additional write operations that are not yet known to have been successfully performed on the backing store and (ii) identify the additional subset of additional write operations based at least in part on the synchronization marker that bifurcates the write operations queued in the cache, (3) a performance module programmed to perform the additional subset of additional write operations on the backing store in order to eliminate the inconsistency between the backing store and the cache, and (4) an update module programmed to update the synchronization marker based at least in part on the performance of the additional subset of additional write operations on the backing store. The system may also include at least one processor configured to execute the detection module, the identification module, the performance module, and the update module.

In some examples, the above-described method may be encoded as computer-readable instructions on a non-transitory computer-readable-storage medium. For example, a non-transitory computer-readable-storage medium may include one or more computer-executable instructions that, when executed by at least one processor of a networking device, may cause the networking device to (1) detect at least one inconsistency between a backing store and a cache that queues write operations destined for the backing store, (2) identify a synchronization marker that bifurcates the write operations queued in the cache into (i) a subset of one or more write operations known to have been successfully performed on the backing store and (ii) an additional subset of one or more additional write operations that are not yet known to have been successfully performed on the backing store, (3) identify the additional subset of additional write operations based at least in part on the synchronization marker that bifurcates the write operations queued in the cache, (4) perform the additional subset of additional write operations on the backing store in order to eliminate the inconsistency between the backing store and the cache, and then (5) update the synchronization marker based at least in part on performing the additional subset of additional write operations on the backing store.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
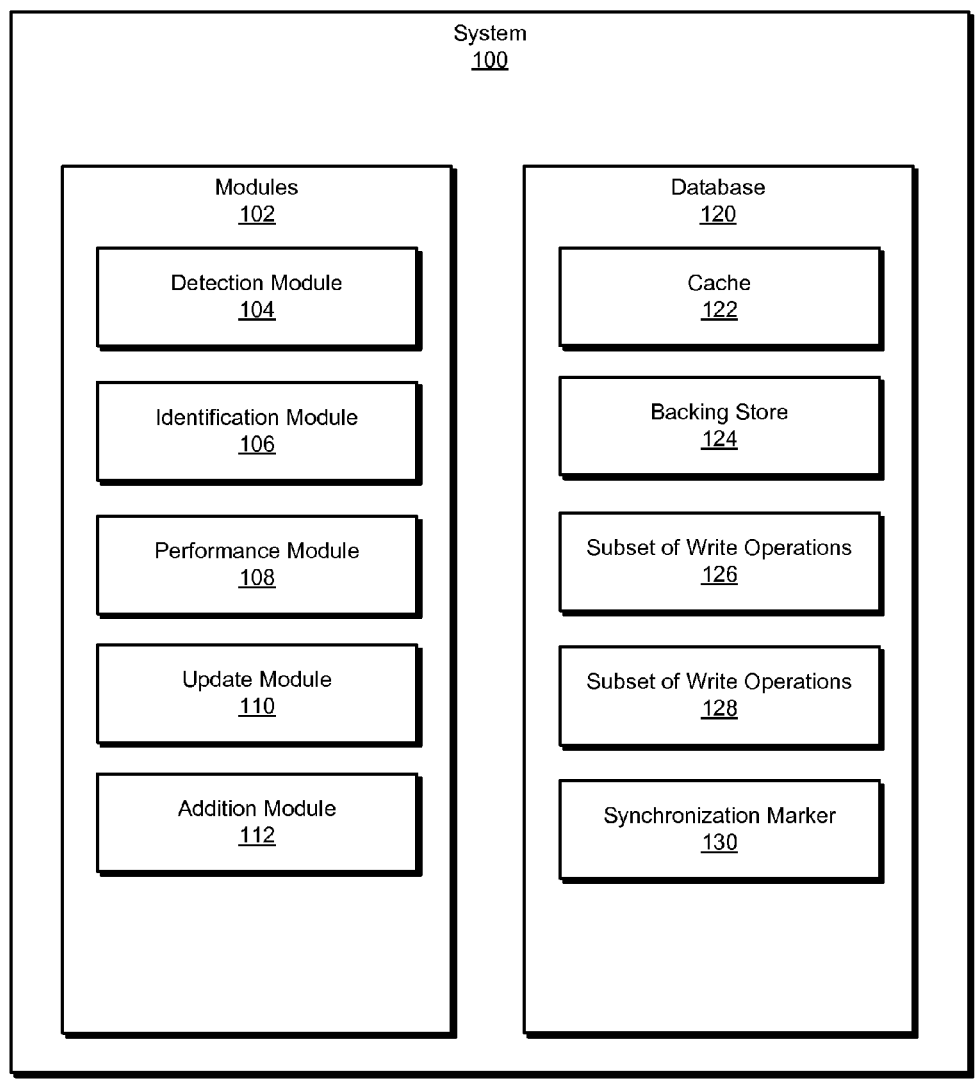
FIG. 1 is a block diagram of an exemplary system for eliminating inconsistencies between backing stores and caches.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for eliminating inconsistencies between backing stores and caches. As will be explained in greater detail below, by detecting at least one inconsistency between a backing store and a cache that queues write operations destined for the backing store, the various systems and methods described herein may determine that the backing store and the cache need to be synchronized in order to avoid application downtime or input/output errors resulting from the inconsistency. By synchronizing the backing store and the cache in response to detecting the inconsistency, the various systems and methods described herein may eliminate the inconsistency and avoid such application downtime and input/output errors.

Figure 2:
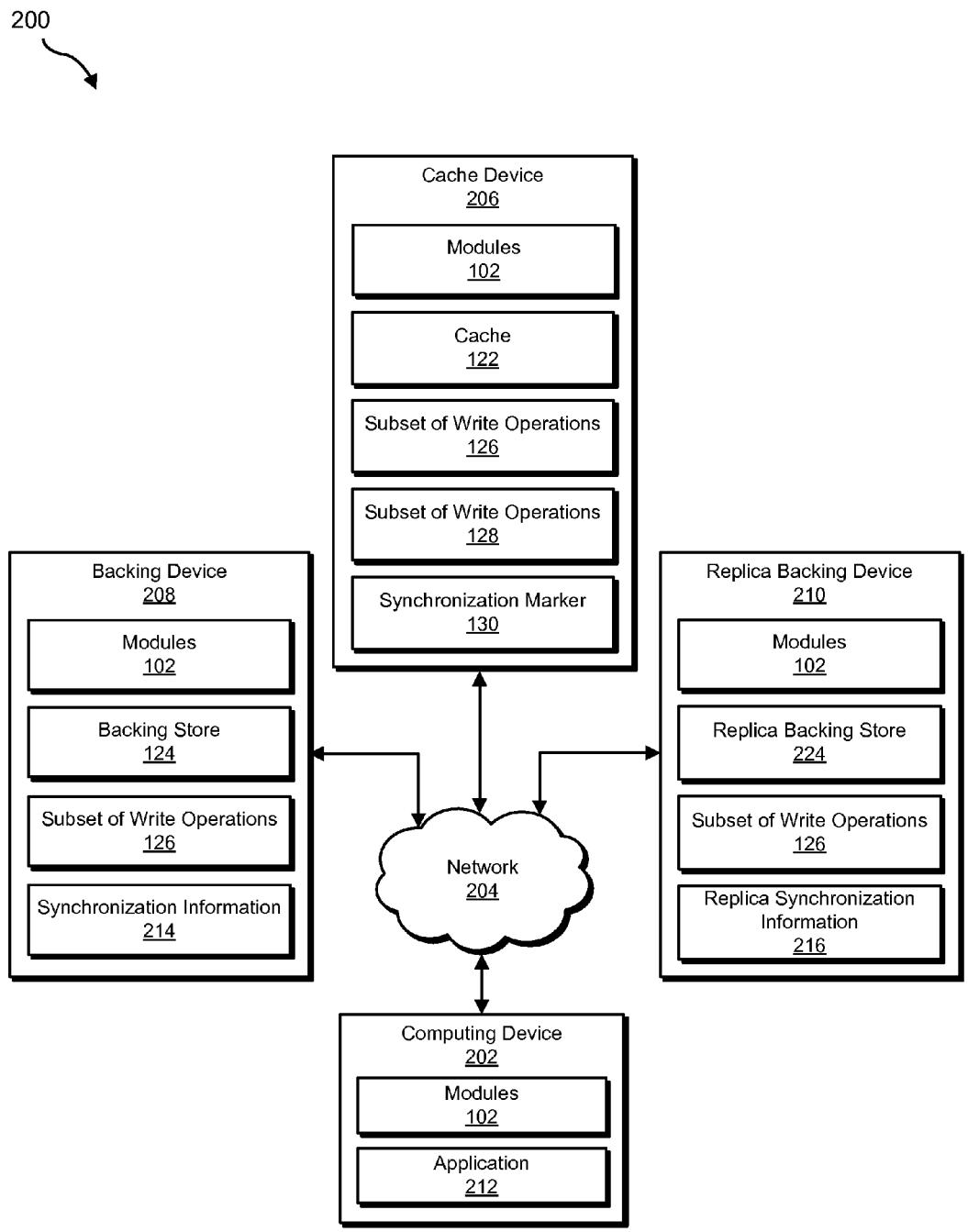
FIG. 2 is a block diagram of an exemplary system for eliminating inconsistencies between backing stores and caches.

The following will provide, with reference to FIGS. 1-2, detailed descriptions of exemplary systems for eliminating inconsistencies between backing stores and caches. Detailed descriptions of corresponding computer-implemented methods will be provided in connection with FIG. 3. Detailed descriptions of an exemplary queue of write operations in a cache device will be provided in connection with FIG. 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for eliminating inconsistencies between backing stores and caches. As illustrated in this figure, exemplary system 100 may include one or more modules 102 for performing one or more tasks. For example, and as will be explained in greater detail below, exemplary system 100 may include a detection module 104 programmed to detect at least one inconsistency between a backing store and a cache that queues write operations destined for the backing store. Exemplary system 100 may also include an identification module 106 programmed to (1) identify a synchronization marker that bifurcates the write operations queued in the cache into (i) a subset of one or more write operations known to have been successfully performed on the backing store and (ii) an additional subset of one or more additional write operations that are not yet known to have been successfully performed on the backing store and (2) identify the additional subset of additional write operations based at least in part on the synchronization marker that bifurcates the write operations queued in the cache.

In addition, and as will be described in greater detail below, exemplary system 100 may include a performance module 108 programmed to perform the additional subset of additional write operations on the backing store in order to eliminate the inconsistency between the backing store and the cache. Exemplary system 100 may further include an update module 110 programmed to update the synchronization marker based at least in part on performing the additional subset of additional write operations on the backing store.

Moreover, and as will be described in greater detail below, exemplary system 100 may include an addition module 112 programmed to add a failed write operation to the additional subset of additional write operations not yet known to have been successfully performed on the backing store. Although illustrated as separate elements, one or more of modules 102 in FIG. 1 may represent portions of a single module or application (such as SYMANTEC'S VERITAS FILE SYSTEM or SYMANTEC'S CLUSTER FILE SYSTEM).

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202, cache device 206, backing device 208, and/or replica backing device 210), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store (1) a cache 122 of application data, (2) a backing store 124 of the application data, (3) a subset of write operations 126 known to have been successfully performed on backing store 124, (4) a subset of write operations 128 not yet known to have been successfully performed on backing store 124, and/or (5) a synchronization marker 130 that bifurcates the subset of write operations 126 and the subset of write operations 128.

Database 120 may represent portions of a single database or computing device or a plurality of databases or computing devices. For example, database 120 may represent a portion of computing device 202, cache device 206, backing device 208, and/or replica backing device 210 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as computing device 202, cache device 206, backing device 208, and/or replica backing device 210 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a network 204 that facilitates communication among a computing device 202, a cache device 206, a backing device 208, and/or a replica backing device 210. Computing device 202 may be programmed with one or more of modules 102 and/or may store all or a portion of the data in database 120.

Additionally or alternatively, cache device 206 may be programmed with one or more of modules 102 and/or may store all or a portion of the data in database 120. Additionally or alternatively, backing device 208 may be programmed with one or more of modules 102 and/or may store all or a portion of the data in database 120. Additionally or alternatively, replica backing device 210 may be programmed with one or more of modules 102 and/or may store all or a portion of the data in database 120.

In one embodiment, one or more of modules 102 from FIG. 1 may, when executed by at least one processor of at least one computing device (such as computing device 202, cache device 206, backing device 208, and/or replica backing device 210 in FIG. 2), facilitate the computing device in eliminating inconsistencies between backing stores and caches. For example, and as will be described in greater detail below, one or more of modules 102 may cause computing device 202, cache device 206, backing device 208, and/or replica backing device 210 to (1) detect at least one inconsistency between backing store 124 and cache 122, (2) identify a synchronization marker 130 that bifurcates write operations queued in cache 122 into (i) the subset of write operations 126 known to have been successfully performed on backing store 124 and (ii) the subset of write operations 128 not yet known to have been successfully performed on backing store 124, (3) identify the subset of write operations 128 based at least in part on synchronization marker 130, (4) perform the subset of write operations 128 on backing store 124 in order to eliminate the inconsistency between backing store 124 and cache 122, and then (5) update synchronization marker 130 based at least in part on performing the subset of write operations 128 on backing store 124.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 510 in FIG. 5, or any other suitable computing device.

Cache device 206 generally represents any type or form of data storage device capable of caching application data and/or propagating write operations associated with the application data to a backing device. Examples of cache device 206 include, without limitation, Solid-State Drives (SSDs), flash memory devices, Random Access Memory (RAM) devices, Central Processing Unit (CPU) cache devices, combinations of one or more of the same, or any other suitable cache device.

Backing device 208 generally represents any type or form of data storage device capable of storing application data and/or receiving write operations associated with the application data from a cache device. Examples of backing device 208 include, without limitation, disk drives, disk arrays, disk storage devices, disk array controllers, computing devices, thin-provisioned storage devices, application servers, web servers, database servers, combinations of one or more of the same, or any other suitable backing device.

Replica backing device 210 generally represents any type or form of data storage device capable of serving as a data mirror to a backing device (in, e.g., a high-availability configuration). Examples of replica backing device 210 include, without limitation, disk drives, disk arrays, disk storage devices, disk array controllers, computing devices, thin-provisioned storage devices, application servers, web servers, database servers, combinations of one or more of the same, or any other suitable replica backing device.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), a Storage Area Network (SAN), a Network Attached Storage (NAS), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections.

Figure 3:
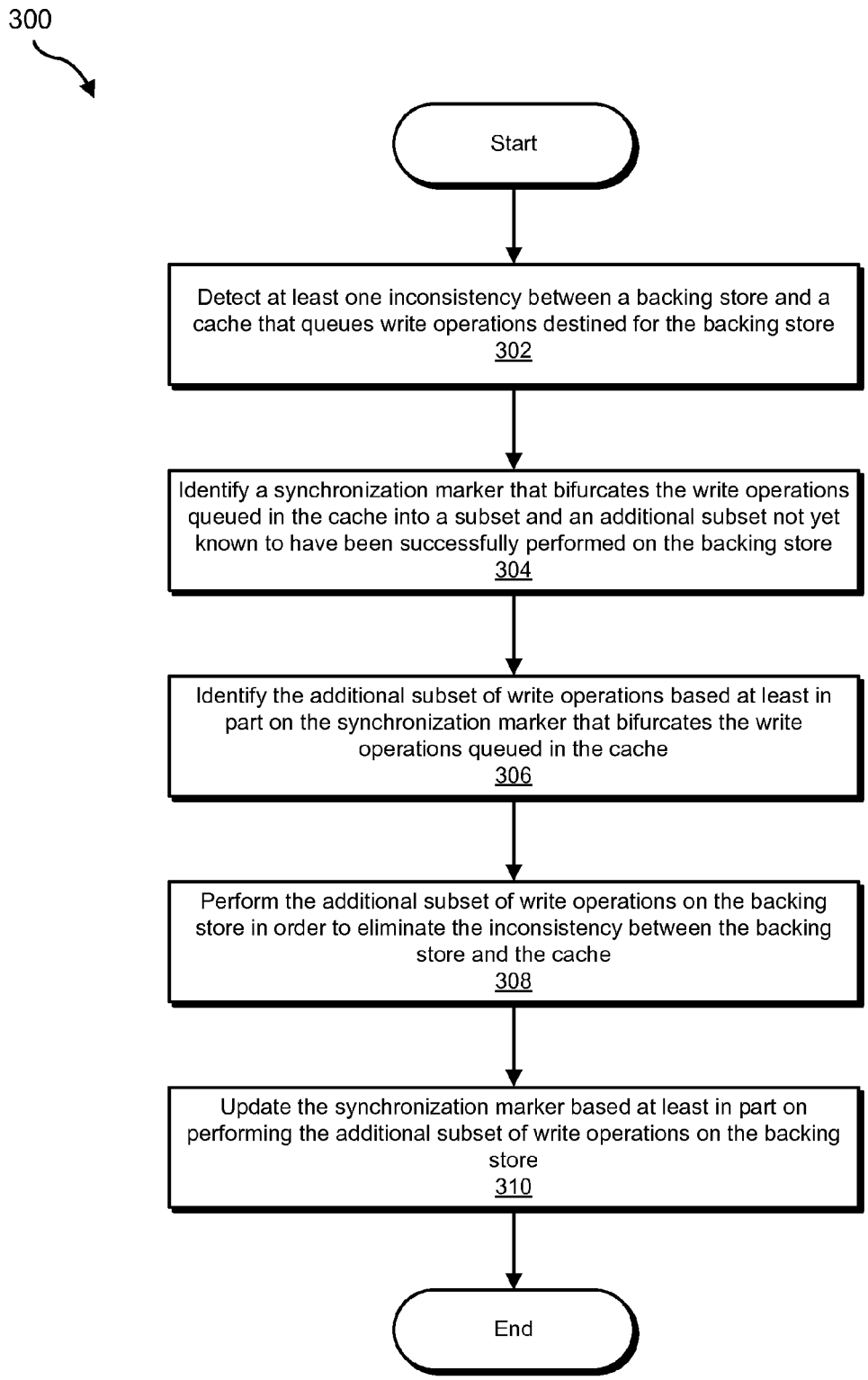
FIG. 3 is a flow diagram of an exemplary method for eliminating inconsistencies between backing stores and caches.

FIG. 3 is a flow diagram of an exemplary computer-implemented method 300 for eliminating inconsistencies between backing stores and caches. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may detect at least one inconsistency between a backing store and a cache that queues write operations destined for the backing store. For example, at step 302 detection module 104 may (as part of computing device 202, cache device 206, and/or backing device 208 in FIG. 2) detect at least one inconsistency between backing store 124 located on backing device 208 and cache 122 located on cache device 206. The term "inconsistency," as used herein, generally refers to at least one difference between the application data stored in backing store 124 and the application data stored in cache 122 (due, e.g., to at least one write operation that was successfully performed on cache 122 but not successfully performed on backing store 124).

The systems described herein may perform step 302 in a variety of ways. In some examples, application 212 installed on computing device 202 may issue a write operation configured to update the application data stored in cache 122 and backing store 124. In one example, upon issuing the write operation, application 212 may direct computing device 202 to send the write operation to cache device 206. In this example, cache device 206 may receive the write operation from computing device 202 and then perform the write operation on cache 122.

Figure 4:
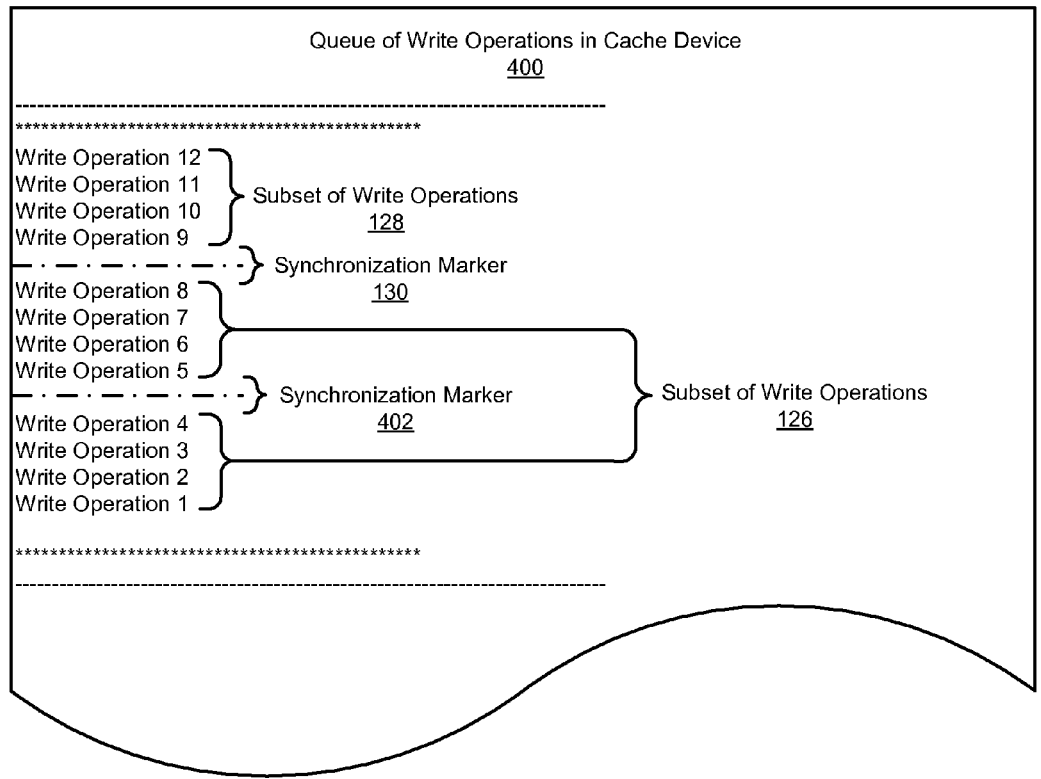
FIG. 4 is an illustration of an exemplary queue of write operations in a cache device.

In some examples, cache device 206 may also store the write operation in queue 400 in FIG. 4 to facilitate flushing the write operation to backing store 124 at a later time (in a process sometimes referred to as "write back" caching). As illustrated in FIG. 4, queue 400 may include a subset of write operations that have been flushed by cache device 206 to backing device 208 (in this example, "Subset of Write Operations 126" consisting of "Write Operation 1" through "Write Operation 8"), a subset of write operations that have been added to queue 400 since the last time cache device 206 flushed the queued write operations to backing device 208 (in this example, "Write Operation 9" through "Write Operation 12"), a synchronization marker that represents the last time cache device 206 flushed the queued write operations to synchronize the application data stored in cache 122 and backing store 124 (in this example, "Synchronization Marker 130"), and a synchronization marker that represents the last time backing device 208 and replica backing device 210 synchronized the application data stored in backing store 124 and replica backing store 224 (in this example, "Synchronization Marker 402").

In some examples, detection module 104 may detect the inconsistency between backing store 124 and cache 122 based at least in part on the number of write operations in queue 400. In one example, detection module 104 may check queue 400 on a periodic basis to determine whether the number of write operations added to queue 400 since the last flush has reached a predefined maximum number. For example, detection module 104 may determine that synchronization marker 130 in FIG. 4 represents the last time cache device 206 flushed the write operations in queue 400 to backing device 208. In this example, detection module 104 may determine that four write operations (e.g., "Write Operation 9" through "Write Operation 12" in FIG. 4) have been added to queue 400 since the last flush based at least in part on the location of synchronization marker 130 in queue 400. Detection module 104 may then determine that the four write operations added to queue 400 since the last flush exceed the number of write operations needed to trigger detection of the inconsistency between backing store 124 and cache 122.

In some examples, detection module 104 may detect the inconsistency between backing store 124 and cache 122 based at least in part on a failed attempt to perform the write operation on backing store 124. For example, cache device 206 may be unable to successfully flush the write operation to backing device 208 (due, e.g., to a temporary communication failure between backing device 208 and cache device 206 or to a transient hardware error resulting from backing store 124 having reached full capacity). As a result, detection module 104 may detect a failed attempt by cache device 206 to flush the write operation to backing device 208. Detection module 104 may then determine that the inconsistency exists between backing store 124 and cache 122 since cache device 206 performed the write operation on cache 122 but cache device 206 was unable to successfully flush the write operation to backing device 208.

Additionally or alternatively, cache device 206 may successfully flush the write operation to backing device 208. However, upon receiving the write operation from cache device 206, backing device 208 may be unable to successfully perform the write operation on backing store 124 (due, e.g., to a permanent hardware failure affecting one or more data storage locations associated with backing store 124 or to a transient hardware error resulting from backing store 124 having reached full capacity). As a result, detection module 104 may detect a failed attempt by backing device 208 to perform the write operation on backing store 124. Detection module 104 may then determine that the inconsistency exists between backing store 124 and cache 122 since cache device 206 performed the write operation on cache 122 but backing device 208 was unable to successfully perform the write operation on backing store 124.

In another example, upon issuing the write operation, application 212 may direct computing device 202 to send the write operation simultaneously to both backing device 208 and cache device 206 (in a process sometimes referred to as "write through" caching). However, computing device 202 may be unable to successfully send the write operation to backing device 208 (due, e.g., to a temporary communication failure between backing device 208 and computing device 202). As a result, detection module 104 may detect a failed attempt by computing device 202 to send the write operation to backing device 208.

Detection module 104 may then determine that the inconsistency exists between backing store 124 and cache 122 since cache device 206 performed the write operation on cache 122 but computing device 202 was unable to successfully send the write operation to backing device 208. In response to this determination, addition module 112 may, as part of cache device 206 in FIG. 2, add the write operation to queue 400 in order to enable cache device 206 to flush the write operation to backing device 208 at a later time.

As illustrated in FIG. 3, at step 304 one or more of the systems described herein may identify a synchronization marker that bifurcates the write operations queued in the cache. For example, at step 304 identification module 106 may (as part of computing device 202, cache device 206, and/or backing device 208 in FIG. 2) identify synchronization marker 130 as bifurcating queue 400 into the subset of write operations 126 known to have been successfully performed on backing store 124 and the subset of write operations 128 not yet known to have been successfully performed on backing store 124. In this example, identification module 106 may initiate the process of identifying synchronization marker 130 in response to the detection of the inconsistency between backing store 124 and cache 122.

The systems described herein may perform step 304 in a variety of ways. In one example, identification module 106 may obtain synchronization information 214 from backing device 208 in order to identify which synchronization marker in queue 400 corresponds to backing store 124. In this example, upon obtaining synchronization information 214 from backing device 208, identification module 106 may use synchronization information 214 to locate the synchronization marker 130 in queue 400 and/or identify synchronization marker 130 as bifurcating queue 400 into the subset of write operations 126 and the subset of write operations 128.

Synchronization information 214 generally refers to any type or form of information capable of being used to determine that synchronization marker 130 represents the most recent synchronization point between backing store 124 and cache 122. Examples of synchronization information 214 include, without limitation, a copy of synchronization marker 130, an identifier (such as a number) associated with synchronization marker 130, a timestamp associated with synchronization marker 130, a particular write operation indicative of the most recent synchronization point between backing store 124 and cache 122, and/or any other suitable synchronization information.

In one example, backing device 208 may maintain a queue of write operations that have been successfully performed on backing store 124. For example, backing device 208 may receive a write operation flushed from cache device 206 and then perform the write operation on backing store 124. In this example, upon performing the write operation on backing store 124, backing device 208 may add the write operation to a queue of write operations that have been successfully performed on backing store 124. Backing device 208 may then superimpose a copy of synchronization marker 130 on the write operation to identify the most recent synchronization point between backing store 124 and cache 122.

In response to the detection of the inconsistency between backing store 124 and cache 122, identification module 106 may access the copy of synchronization marker 130 superimposed on the write operation in the queue. Upon accessing the copy of synchronization marker 130, identification module 106 may analyze the copy of synchronization marker 130 and then determine that synchronization marker 130 represents the most recent synchronization point between backing store 124 and cache 122 based at least in part on this analysis.

As illustrated in FIG. 3, at step 306 one or more of the systems described herein may identify the additional subset of additional write operations based at least in part on the synchronization marker that bifurcates the write operations queued in the cache. For example, at step 306 identification module 106 may (as part of computing device 202, cache device 206, and/or backing device 208 in FIG. 2) identify the subset of write operations 128 in queue 400 based at least in part on synchronization marker 130. In this example, identification module 106 may initiate the process of identifying the subset of write operations 128 in queue 400 in response to the detection of the inconsistency between backing store 124 and cache 122.

The systems described herein may perform step 306 in a variety of ways. In one example, upon identifying synchronization marker 130, identification module 106 may determine that the subset of write operations 128 are not yet known to have been successfully performed on backing store 124 based at least in part on synchronization marker 130. For example, identification module 106 may locate synchronization marker 130 in queue 400. In this example, upon locating synchronization marker 130 in queue 400, identification module 106 may analyze synchronization maker 130 with respect to the ordering of write operations in queue 400 and then determine that "Write Operation 9" through "Write Operation 12" are not yet known to have been successfully performed on backing store 124 based at least in part on this analysis.

As illustrated in FIG. 3, at step 308 one or more of the systems described herein may perform the additional subset of additional write operations on the backing store in order to eliminate the inconsistency between the backing store and the cache. For example, at step 308 performance module 108 may (as part of computing device 202, cache device 206, and/or backing device 208 in FIG. 2) perform the subset of write operations 128 in queue 400 on backing store 124 in order to eliminate the inconsistency between backing store 124 and cache 122. In this example, performance module 108 may initiate the process of performing the subset of write operations 128 in response to the identification of the subset of write of write operations 128.

The systems described herein may perform step 308 in a variety of ways. In one example, the inconsistency between backing store 124 and cache 122 may have resulted from a temporary storage error (such as a temporary communication failure between backing device 208 and cache device 206 or a transient hardware error resulting from backing store 124 having reached full capacity). For example, a systems administrator may have mistakenly disconnected the communication channel that facilitates communication between backing device 208 and cache device 206. In this example, the systems administrator may later realize his or her mistake and then immediately reconnect the communication channel to reestablish communication between backing device 208 and cache device 206.

As the systems administrator reconnects the communication channel to reestablish communication between backing device 208 and cache device 206, performance module 108 may determine that the inconsistency resulted from a temporary communication failure between backing device 208 and cache device 206. For example, performance module 108 may direct cache device 206 to attempt to reestablish communication with backing device 208. In the event that cache device 206 is able to reestablish communication with backing device 208, performance module 108 may determine that the inconsistency resulted from a temporary communication failure that has been resolved based at least in part on the ability of cache device 206 to reestablish communication with backing device 208. Performance module 108 may then flush "Write Operation 9" through "Write Operation 12" to backing device 208 in response to determining that the temporary communication failure has been resolved.

In another example, performance module 108 may receive a communication indicating that backing device 208 has been brought back online. In this example, performance module 108 may determine that the inconsistency resulted from backing device 208 being temporarily taken offline based at least in part on this communication. Performance module 108 may then flush "Write Operation 9" through "Write Operation 12" to backing device 208 in response to determining that the inconsistency resulted from backing device 208 being temporarily taken offline.

In one example, performance module 108 may determine that the inconsistency resulted from a temporary communication failure based at least in part on an input/output error received in connection with a failed attempt to perform a write operation on backing device 208. For example, performance module 108 may attempt but fail to flush the subset of write operations 128 to backing device 208. In this example, performance module 108 may then receive an input/output error indicating that the attempt to flush the subset of write operations 128 failed due at least in part to the disconnection of the communication channel between backing device 208 and cache device 206.

In a further example, the inconsistency between backing store 124 and cache 122 may have resulted from a transient hardware error. For example, a systems administrator may have configured backing device 208 to provide thin provisioning of backing store 124. In this example, backing store 124 may have reached full capacity such that performance module 108 is unable to perform the subset of write operations 128 on backing store 124 until the systems administrator has provisioned additional storage space to backing store 124.

After the systems administrator has provisioned additional storage space to backing store 124, performance module 108 may determine that the inconsistency resulted from a transient hardware error. For example, performance module 108 may attempt to perform the subset of write operations 128 on backing store 124 in response to the additional storage space having been provisioned to backing store 124. In the event that performance module 108 is able to successfully perform the subset of write operations 128 on backing store 124, performance module 108 may determine that the inconsistency resulted from a transient hardware error that has since been resolved by provisioning the additional storage space to backing store 124.

In one example, the inconsistency between backing store 124 and cache 122 may have resulted from a permanent hardware failure. For example, backing device 208 may have experienced a permanent hardware failure affecting one or more data storage locations associated with backing store 124. In this example, performance module 108 may determine that the inconsistency resulted from the permanent hardware failure experienced by backing device 208 based at least in part on the duration of time that backing device 208 has remained offline. Additionally or alternatively, performance module 108 may determine that the inconsistency resulted from the permanent hardware failure experienced by backing device 208 based at least in part on an input/output error received in connection with a failed attempt to perform a write operation on backing device 208.

In response to determining that the inconsistency resulted from the permanent hardware failure, performance module 108 may identify replica backing store 224 configured to mirror backing store 124 on replica backing device 210. For example, replica backing device 210 may be configured to synchronize the application data stored in replica backing store 224 with the application data stored in backing store 124. In one example, replica backing device 210 may synchronize replica backing store 224 with backing store 124 on a periodic basis. In another example, replica backing device 210 may synchronize replica backing store 224 with backing store 124 by updating the application data stored in replica backing store 224 and backing store 124 simultaneously based at least in part on the write operations flushed from cache device 206.

Upon identifying replica backing store 224, performance module 108 may synchronize replica backing store 224 and cache 122 by performing the subset of write operations 128 on replica backing store 224. For example, performance module 108 may flush the subset of write operations 128 to replica backing device 210. In this example, replica backing device 210 may receive the subset of write operations 128 and then perform the subset of write operations 128 on replica backing store 224 in order to update the application data stored in replica backing store 224. In addition, performance module 108 may replace backing store 124 with the replica backing store 224 such that cache 122 queues write operations destined for replica backing store 224 instead of queuing write operations destined for backing store 124.

In one example, identification module 106 may obtain replica synchronization information 216 from replica backing device 210 in order to identify which synchronization marker in queue 400 corresponds to backing store 124. In this example, upon obtaining replica synchronization information 216 from replica backing device 210, identification module 106 may use replica synchronization information 216 to locate synchronization marker 402 in queue 400 and/or identify synchronization marker 402 as bifurcating queue 400 into a subset of write operations known to have been successfully performed on replica backing store 224 and an additional subset of additional write operations not yet known to have been successfully performed on replica backing store 224.

Replica synchronization information 216 generally refers to any type or form of information capable of being used to determine that synchronization marker 402 represents the most recent synchronization point between replica backing store 224 and backing store 124 (and/or cache 122). Examples of replica synchronization information 216 include, without limitation, a copy of synchronization marker 402, an identifier (such as a number) associated with synchronization marker 402, a timestamp associated with synchronization marker 402, a particular write operation indicative of the most recent synchronization point between replica backing store 224 and backing store 124 (and/or cache 122), and/or any other suitable replica synchronization information.

In one example, upon identifying synchronization marker 402, identification module 106 may analyze synchronization marker 402 with respect to the ordering of write operations in queue 400 and then determine that "Write Operation 5" through "Write Operation 12" are not yet known to have been successfully performed on replica backing store 224 based at least in part on this analysis. In this example, performance module 108 may perform "Write Operation 5" through "Write Operation 12" on replica backing store 224 in response to the determination that "Write Operation 5" through "Write Operation 12" are not yet known to have been successfully performed on replica backing store 224. For example, performance module 108 may flush "Write Operation 5" through "Write Operation 12" to replica backing device 210. In this example, replica backing device 210 may receive "Write Operation 5" through "Write Operation 12" and then perform the same on replica backing store 224 in order to update the application data stored in replica backing store 224.

As illustrated in FIG. 3, at step 310 one or more of the systems described herein may update the synchronization marker based at least in part on performing the additional subset of additional write operations on the backing store. For example, at step 310 update module 110 may (as part of computing device 202, cache device 206, and/or backing device 208 in FIG. 2) update synchronization marker 130 in queue 400 based at least in part on the performance of the subset of write operations 128 on backing store 124. In this example, update module 110 may initiate the process of updating synchronization marker 130 in queue 400 in response to the identification of the subset of write of write operations 128.

The systems described herein may perform step 310 in a variety of ways. In one example, update module 110 may modify synchronization marker 130 to indicate that the subset of write operations 128 have been successfully performed on backing store 124. For example, update module 110 may move synchronization marker 130 from below "Write Operation 9" to above "Write Operation 12" in FIG. 4 such that synchronization marker 130 represents the most recent synchronization point between backing store 124 and cache 122. In this example, synchronization marker 130 may no longer bifurcate the write operations in queue 400 since synchronization marker 130 represents the most recent synchronization point between backing store 124 and cache 122.

Additionally or alternatively, update module 110 may modify the copy of synchronization marker 130 in the queue of write operations that have been successfully performed on backing store 124. Additionally or alternatively, update module 110 may modify the copy of synchronization marker 402 in the queue of write operations that have been successfully performed on replica backing store 224. Upon completion of step 310 in FIG. 3, exemplary method 300 may terminate.

However, exemplary method 300 may also include one or more steps not illustrated in FIG. 3. For example, prior to the performance of the subset of write operations 128 on backing store 124, detection module 104 may detect a read operation issued by application 212 installed on computing device 202. In response to the detection of the read operation issued by application 212, performance module 108 may perform the read operation on cache 122 instead of backing store 124 since the inconsistency between backing store 124 and cache 122 has not yet been eliminated. By performing the read operation on cache 122 instead of backing store 124, performance module 108 may enable application 212 to avoid downtime or input/output errors resulting from the inconsistency between backing store 124 and cache 122.

As explained above in connection with method 300 in FIG. 3, a file-system application may eliminate at least one data inconsistency between a disk-based backing store and an SSD-based cache that queues write operations destined for the disk-based backing store. For example, the file-system application may periodically check the cache's queue to determine whether the write operations in the cache's queue need to be flushed to the backing store. In one example, upon checking the queue, the file-system application may determine that the write operations in the queue need to be flushed to the backing store in the event that the number of write operations in the queue exceeds a predefined maximum number. The file-system application may then flush the write operations in the queue to the backing store.

Upon flushing the write operations to the backing store, the file-system application may superimpose a synchronization marker on the last of the write operations stored in the cache's queue and the backing store's queue to represent the most recent synchronization point between the backing store and the cache. In the event that a user application issues a subsequent write operation that is successfully performed on the cache but not successfully performed on the backing store (due, e.g., to an intermittent communication failure), the file-system application may need to synchronize the backing store and the cache in order to prevent the user application from experiencing downtime or input/output errors.

As such, the file-system application may access the backing store's queue to identify the synchronization marker that represents the most recent synchronization point between the backing store and the cache. Upon identifying the synchronization marker that represents the most recent synchronization point between the backing store and the cache, the file-system application may access the cache's queue to locate the synchronization marker in the cache's queue. The file-system application may analyze the synchronization marker with respect to the ordering of write operations in the cache's queue and then identify one or more write operations that have been performed on the cache but not performed on the backing store based at least in part on this analysis.

Upon identifying the write operations that have been performed on the cache but not performed on the backing store since the most recent synchronization point, the file-system application may flush these write operations to the backing store in order to synchronize the backing store and the cache. By synchronizing the backing store and the cache after the failed attempt to perform the write operation on the backing store, the file-system application may eliminate the data inconsistency resulting from the failed attempt to perform the write operation on the backing store. Moreover, by eliminating the data inconsistency resulting from the subsequent write failure, the file-system application may enable the user application to avoid downtime or input/output errors resulting from the data inconsistency.

Figure 5:
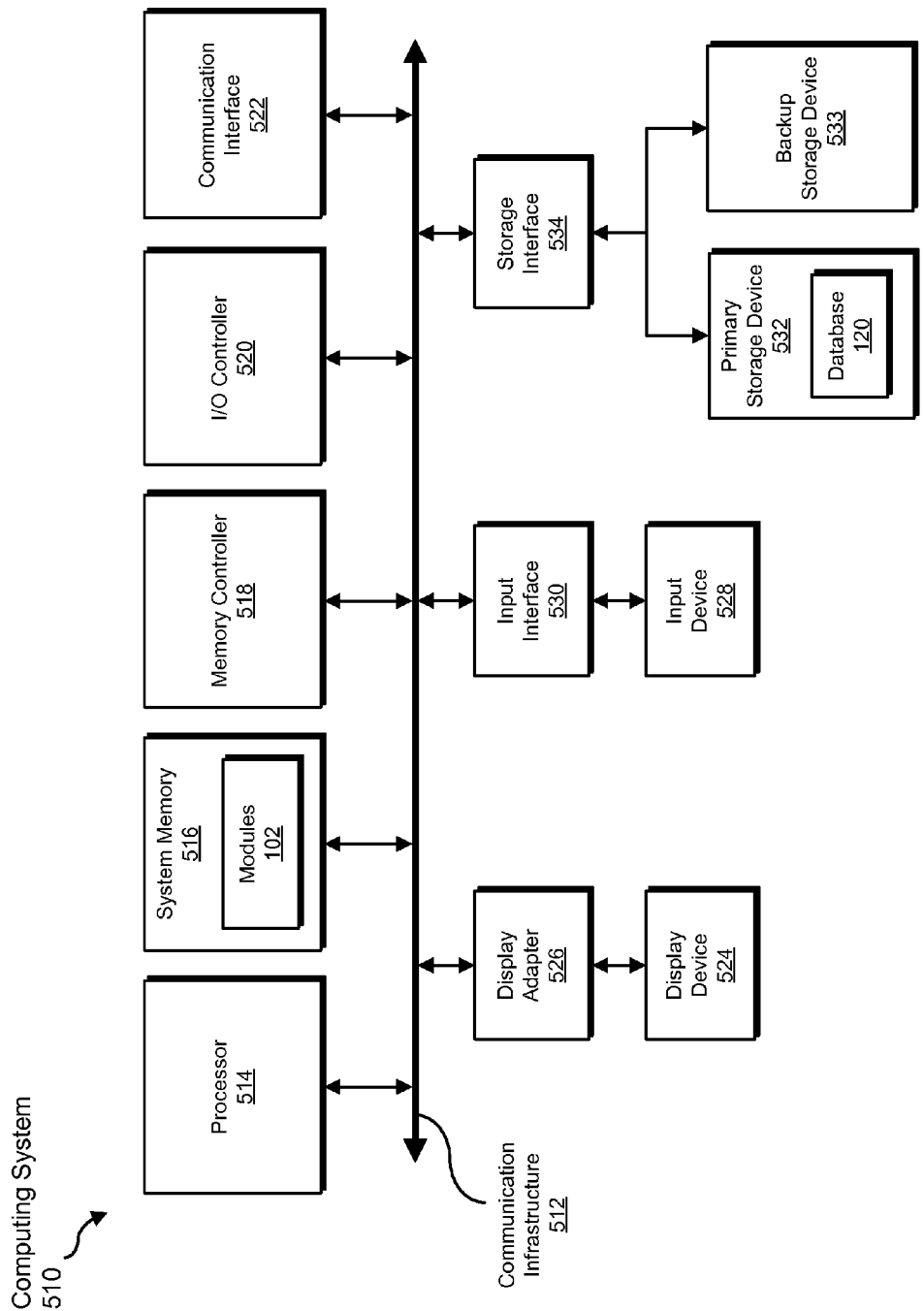
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the detecting, identifying, performing, updating, adding, determining, comparing, obtaining, locating, synchronizing, replacing, and modifying steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
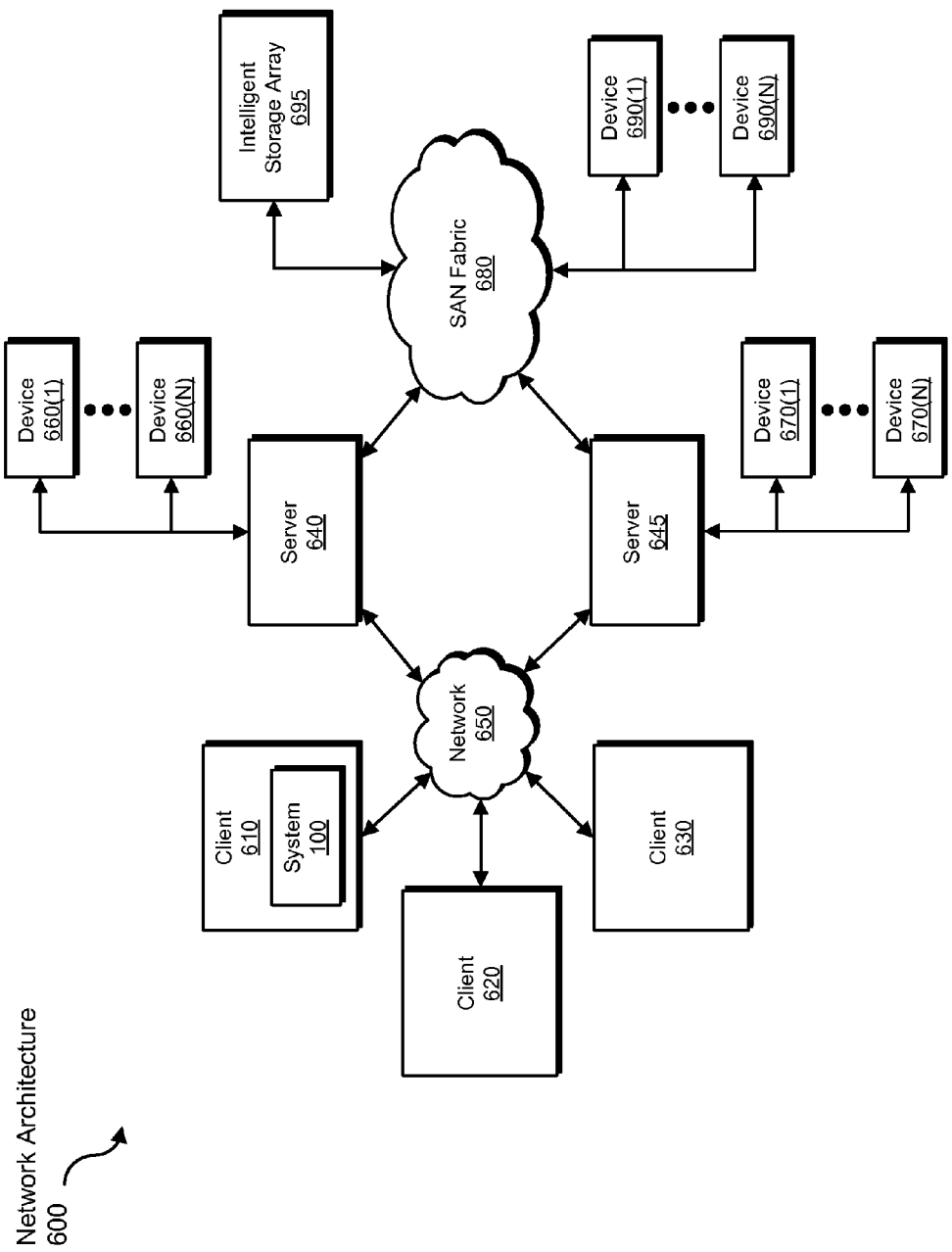
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the detecting, identifying, performing, updating, adding, determining, comparing, obtaining, locating, synchronizing, replacing, and modifying steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for eliminating inconsistencies between backing stores and caches.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive data representative of a synchronization marker to be transformed, transform the data representative of the synchronization marker, output a result of the transformed data representative of the synchronization marker, use the result of the transformed data representative of the synchronization marker to synchronize a backing store and a cache, and store the result of the transformed data representative of the synchronization marker to the backing store. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for eliminating inconsistencies between backing stores and caches, at least a portion of the method being performed by a computing device comprising at least one processor, the method comprising:
    superimposing a synchronization marker on at least one write operation in a cache that queues write operations destined for a backing store, the synchronization marker bifurcating the write operations queued in the cache into:
        a subset of one or more write operations known to have been successfully performed on the backing store;
        an additional subset of one or more additional write operations that are not yet known to have been successfully performed on the backing store;
    superimposing a corresponding synchronization marker on copies, in the backing store, of write operations from the at least one write operation, the synchronization marker and the corresponding synchronization marker representing a most recent synchronization point between the backing store and the cache;
    detecting at least one inconsistency between the backing store and the cache that queues write operations destined for the backing store;
    in response to detecting the inconsistency between the backing store and the cache that queues the write operations destined for the backing store:
        identifying the synchronization marker;
        identifying the additional subset of additional write operations based at least in part on the synchronization marker that bifurcates the write operations queued in the cache;
    in response to identifying the additional subset of additional write operations based at least in part on the synchronization marker:
        performing the additional subset of additional write operations on the backing store in order to eliminate the inconsistency between the backing store and the cache;

updating the synchronization marker based at least in part on performing the additional subset of additional write operations on the backing store.

2. The method of claim 1, wherein detecting the inconsistency between the backing store and the cache comprises detecting a failed attempt to perform a write operation on the backing store.

3. The method of claim 2, wherein detecting the failed attempt to perform the write operation on the backing store comprises adding the write operation to the additional subset of additional write operations not yet known to have been successfully performed on the backing store.

4. The method of claim 1, wherein detecting the inconsistency between the backing store and the cache comprises determining that the additional subset of additional write operations not yet known to have been successfully performed on the backing store has reached a predefined maximum number of write operations.

5. The method of claim 4, wherein determining that the additional subset of additional write operations has reached the predefined maximum number of write operations comprises:
- comparing the additional subset of additional write operations with the predefined maximum number of write operations on a periodic basis;
- determining, based at least in part on the comparison, that the additional subset of additional write operations has reached the predefined maximum number of write operations.

6. The method of claim 1, wherein identifying the synchronization marker that bifurcates the write operations queued in the cache comprises:
- identifying the corresponding synchronization marker in the backing store;
- locating the synchronization marker in the cache based at least in part on the corresponding synchronization marker identified in the backing store.

7. The method of claim 1, further comprising, prior to performing the additional subset of additional write operations on the backing store:
- detecting a read operation issued by an application using the backing store and the cache;
- performing the read operation on the cache instead of the backing store in order to enable the application to avoid downtime resulting from the inconsistency between the backing store and the cache.

8. The method of claim 1, wherein performing the additional subset of additional write operations on the backing store comprises:
- determining that the inconsistency resulted from a temporary communication failure between the backing store and the cache;
- determining that the temporary communication failure between the backing store and the cache has been resolved;
- in response to determining that the temporary communication failure has been resolved, performing the additional subset of additional write operations on the backing store in order to eliminate the inconsistency between the backing store and the cache.

9. The method of claim 1, wherein performing the additional subset of additional write operations on the backing store comprises:
- determining that the inconsistency resulted from a permanent hardware failure on the backing store;
- in response to determining that the inconsistency resulted from the permanent hardware failure on the backing store:
  - identifying a replica backing store configured to mirror the backing store;
  - synchronizing the replica backing store and the cache by performing the additional subset of additional write operations on the replica backing store;
  - replacing the backing store with the replica backing store such that the cache queues write operations destined for the replica backing store instead of queuing write operations destined for the backing store.

10. The method of claim 9, wherein synchronizing the replica backing store and the cache comprises performing at least a portion of the subset of write operations on the replica backing store.

11. The method of claim 10, wherein synchronizing the replica backing store and the cache comprises:
- obtaining replica synchronization information from the replica backing store;
- determining, based at least in part on the replica synchronization information, that the portion of the subset of write operations and the additional subset of additional write operations have not yet been performed on the replica backing store;
- in response to determining that the portion of the subset of write operations and the additional subset of additional write operations have not yet been performed on the replica backing store:
- performing the portion of the subset of write operations on the replica backing store;
- performing all of the additional subset of additional write operations on the replica backing store.

12. The method of claim 1, wherein updating the synchronization marker comprises modifying the synchronization marker to indicate that the additional subset of additional write operations have been successfully performed on the backing store.

13. A system for eliminating inconsistencies between backing stores and caches, the system comprising:
- a synchronization module programmed to:
  - superimpose a synchronization marker on at least one write operation in a cache that queues write operations destined for a backing store, the synchronization marker bifurcating the write operations queued in the cache into:
    - a subset of one or more write operations known to have been successfully performed on the backing store;
    - an additional subset of one or more additional write operations that are not yet known to have been successfully performed on the backing store;
  - superimpose a corresponding synchronization marker on copies, in the backing store, of write operations from the at least one write operation, the synchronization marker and the corresponding synchronization marker representing a most recent synchronization point between the backing store and the cache;
- a detection module programmed to detect at least one inconsistency between the backing store and the cache that queues write operations destined for the backing store;
- an identification module programmed to:
  - identify the synchronization marker;

identify the additional subset of additional write operations based at least in part on the synchronization marker that bifurcates the write operations queued in the cache;

a performance module programmed to perform the additional subset of additional write operations on the backing store in order to eliminate the inconsistency between the backing store and the cache;

an update module programmed to update the synchronization marker based at least in part on the performance of the additional subset of additional write operations on the backing store;

at least one processor configured to execute the synchronization module, the detection module, the identification module, the performance module, and the update module.

14. The system of claim 13, wherein the detection module is programmed to detect a failed attempt to perform a write operation on the backing store.

15. The system of claim 14, further comprising an addition module programmed to add the write operation to the additional subset of additional write operations not yet known to have been successfully performed on the backing store.

16. The system of claim 13, wherein the detection module is programmed to determine that the additional subset of additional write operations not yet known to have been successfully performed on the backing store has reached a predefined maximum number of write operations.

17. The system of claim 16, wherein the detection module is programmed to:
compare the additional subset of additional write operations with the predefined maximum number of write operations on a periodic basis;
determine, based at least in part on the comparison, that the additional subset of additional write operations has reached the predefined maximum number of write operations.

18. The system of claim 13, wherein the identification module is programmed to:
identify the corresponding synchronization marker in the backing store;
locate the synchronization marker in the cache based at least in part on the corresponding synchronization marker identified in the backing store.

19. The system of claim 13, wherein:
the detection module is programmed to detect a read operation issued by an application using the backing store and the cache prior to the performance of the additional subset of additional write operations on the backing store;

the performance module is programmed to perform the read operation on the cache instead of the backing store in order to enable the application to avoid downtime resulting from the inconsistency between the backing store and the cache.

20. A non-transitory computer-readable-storage medium comprising one or more computer-executable instructions that, when executed by at least one processor of a networking device, cause the networking device to:
superimpose a synchronization marker on at least one write operation in a cache that queues write operations destined for a backing store, the synchronization marker bifurcating the write operations queued in the cache into:
a subset of one or more write operations known to have been successfully performed on the backing store;
an additional subset of one or more additional write operations that are not yet known to have been successfully performed on the backing store;
superimpose a corresponding synchronization marker on copies, in the backing store, of write operations from the at least one write operation, the synchronization marker and the corresponding synchronization marker representing a most recent synchronization point between the backing store and the cache;
detect at least one inconsistency between the backing store and the cache that queues write operations destined for the backing store;
in response to detecting the inconsistency between the backing store and the cache that queues the write operations destined for the backing store:
identify the synchronization marker;
identify the additional subset of additional write operations based at least in part on the synchronization marker that bifurcates the write operations queued in the cache;
in response to identifying the additional subset of additional write operations based at least in part on the synchronization marker:
perform the additional subset of additional write operations on the backing store in order to eliminate the inconsistency between the backing store and the cache;
update the synchronization marker based at least in part on performing the additional subset of additional write operations on the backing store.

* * * * *